April 14, 1953   W. H. UNDERWOOD ET AL   2,634,511
RICE DRIER
Filed July 21, 1950   2 SHEETS—SHEET 1

INVENTORS
Wilford H. Underwood
Ernst Toepfer
BY Victor J. Evans & Co.
ATTORNEYS

April 14, 1953　　W. H. UNDERWOOD ET AL　　2,634,511
RICE DRIER

Filed July 21, 1950　　2 SHEETS—SHEET 2

INVENTORS
Wilford H. Underwood
Ernst Toepfer
BY Victor J. Evans & Co.
ATTORNEYS

Patented Apr. 14, 1953

2,634,511

UNITED STATES PATENT OFFICE 2,634,511

RICE DRIER

Wilford H. Underwood and Ernst Toepfer, Crowley, La.

Application July 21, 1950, Serial No. 175,156

6 Claims. (Cl. 34—57)

This invention relates to grain drying devices of the type in which grain is placed on perforated trays, and in particular a vertically disposed housing having enclosed individual horizontally disposed sections with perforated trays therein with means feeding rice to the trays, means for receiving rice from the trays and means for blowing air upwardly through the perforations of the trays.

The purpose of this invention is to provide a rice dryer where the rice is dried in a plurality of stages and wherein the drying elements of each stage are independently controlled.

The present method used on all rice driers, is that of blowing hot air at a temperature ranging from 90° to 130° Fahrenheit. This heat checks the rice, and causes the grain to break. The heat also destroys the germination of the grain. In many cases seed rice is ruined from this cause. Rice taken from the present driers using heat, cannot be brought to the mill for milling, it must first be allowed to cool. This is a very costly operation, because the rice has to be stored in bins, and allowed to cool before it is ready for the mill. Using heat is a very expensive, and not a satisfactory method. The conventional driers use a squirrel-cage blower to distribute the hot air to the rice, and whatever humidity or moisture that is in the air goes into the rice. On some days when the humidity is high rice can not be dried with the present methods. With this thought in mind this invention contemplates drying rice with dry compressed air where the rice will dry regardless of high humidity and wherein the rice can be taken from the drier directly to the mill and milled. By this means there is no checking or breaking of the grain, and the germination of the grain is not hurt.

The object of this invention is, therefore, to provide means for constructing a rice dryer wherein rice is dried on individual perforated trays with each tray in an enclosed compartment.

Another object of the invention is to provide a rice dryer having a plurality of horizontally disposed perforated trays with each tray in an enclosed compartment and provided with feeding and discharging means, in which means is provided for regulating the amount of rice supplied to each tray and also with means for regulating the amount of air supplied to the trays.

A further object of the invention is to provide a rice dryer having a plurality of superimposed perforated trays positioned in individual compartments with means for supplying and removing rice to and from the trays and means for blowing air through the trays which is of a simple and economical construction.

With these and other objects and advantages in view the invention embodies a substantially rectangular shaped vertically disposed housing having spaced horizontally disposed partitions dividing the housing into sealed compartments with perforated trays having sloping lower surfaces positioned in the compartments, with tubes extended from low points of the trays to a discharge pipe, and with means for blowing air through the said compartments.

Other features and advantages of the invention will appear from the following description taken in connection with the drawings wherein.

Figure 1:
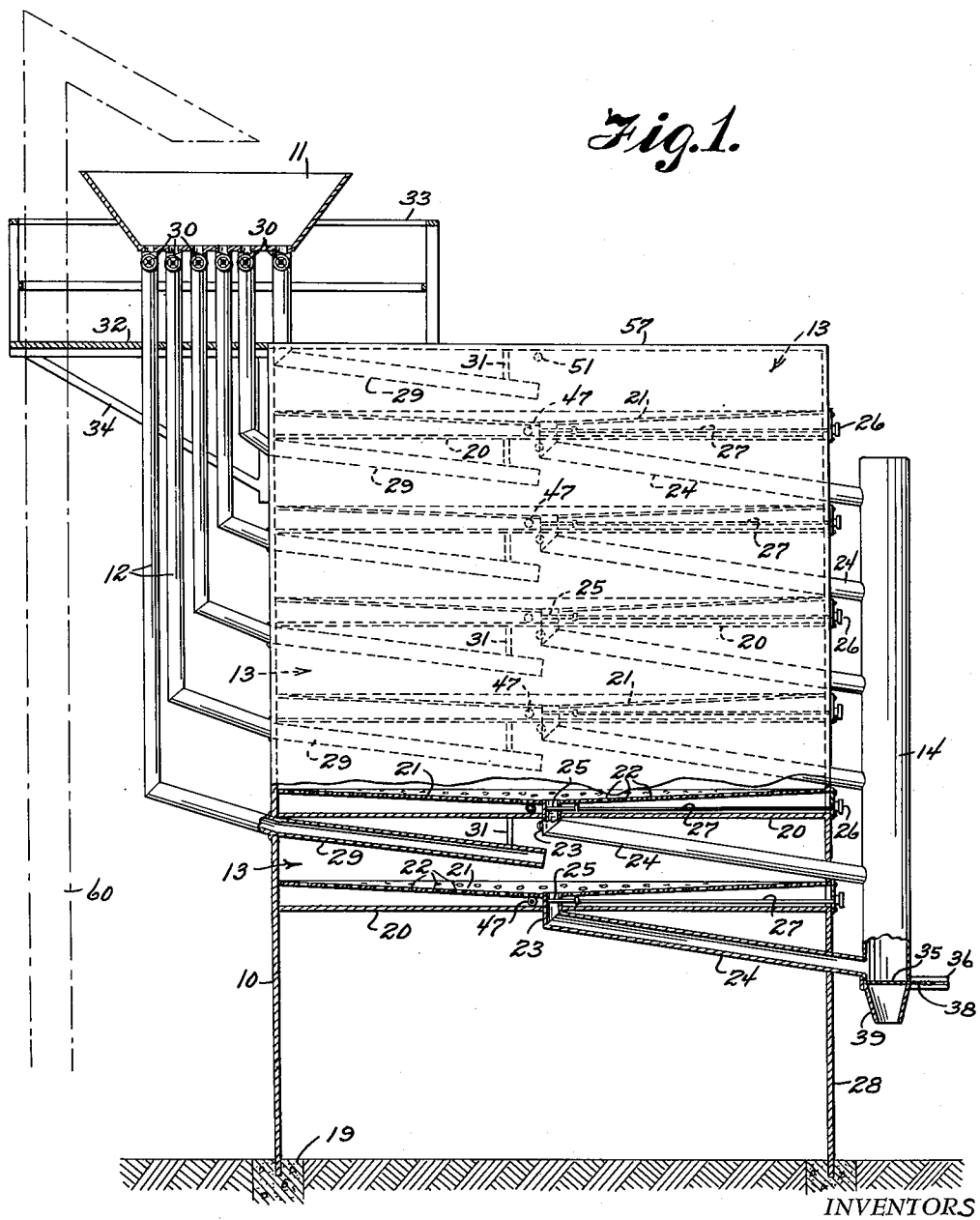
Figure 1 is a side elevational view of the rice dryer with parts broken away and shown in section.

Referring now to the drawings wherein like reference characters denote corresponding parts the rice dryer of this invention includes a vertically disposed rectangular shape housing 10, a feed hopper 11 having chutes 12 extended to points in compartments 13 in the housing, a dry rice header 14, an air compressor 15, a compressed air storage tank 16 and dryers 17 and 18.

The walls of the housing 10 are supported in a foundation 19 and the upper part of the housing is provided with spaced horizontally disposed partitions 20 which divide the housing into a plurality of spaced compartments 13. Trays 21 with sloping lower surfaces, as shown in Figure 1, and with perforations 22 therein are positioned in the lower parts of the compartments with the low points of the trays connected to vertical sections 23 of discharge tubes 24 which connect the trays to the receiving header 14. The sections 23 of the discharge chutes are provided with valves 25 and the valves are controlled by hand wheels 26 on the outer ends of rods 27 that extend from the sections 23 at the center of the housing through the front wall 28 of the housing.

The chutes 12, which extend from the feed hopper 11 are provided with sloping inner ends 29 that carry the rice to points above the centers of the trays and the upper ends of the chutes are provided with valves 30 with which the amount of rice supplied to the trays is controlled and by which sections of the dryer may be cut out. The sections 29 of the chutes are supported by hangers 31 as shown in Figure 1.

The feed hopper 19 is positioned above a platform 32 having a hand rail 33 extended around the outer edge thereof and the extended end of the platform is supported from the housing by a bracket 34.

The lower end of the receiving header 14 is provided with a valve which is formed by a plate 35 slidably mounted between tracks 36 and 37 and having a hand hole opening 38 in the outer end by which it may be operated to open or close the lower end of the receiving header 14. The lower end of the header is provided with a frustro-conical shaped outlet spout 39 through which rice is supplied to containers, bags, or the like.

Air is supplied to the compartments 13 of the housing by the compressor 15 which pumps air into the reservoir 16 and the air is drawn through a dryer 17 containing silica gel or the like with the dryer provided with an inlet connection 40 and being connected to the compressor through a connection 41. The compressor is connected to the tank 16 through a similar connection 42 and the tank or reservoir is connected to the dryer 18 through a connection 43 having an outlet connection 44 with a valve 45 therein extended therefrom. The dryer 18 also contains silica gel or a suitable drying agent and from this dryer the air passes through a vertically disposed pipe 46 from which branches 47 extend into the compartments 13, the branches being positioned between the lower partition 20 and the perforated trays 21. The pipe 46 is provided with valves 48 that are positioned between the compartments.

The compartments are also provided with outlet connections 49 that extend from a vertically disposed pipe 50 and the pipe 50 is provided with valves 51, between the compartments.

Figure 2:
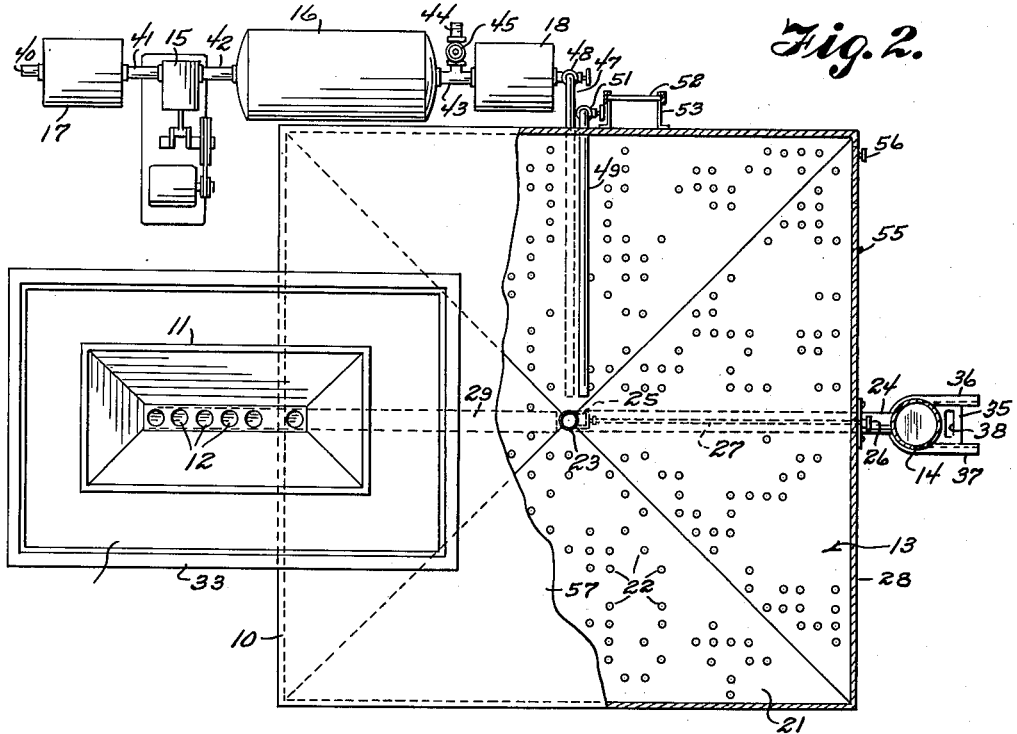
Figure 2 is a plan view of the rice dryer also with parts broken away and shown in section.
Figure 3:
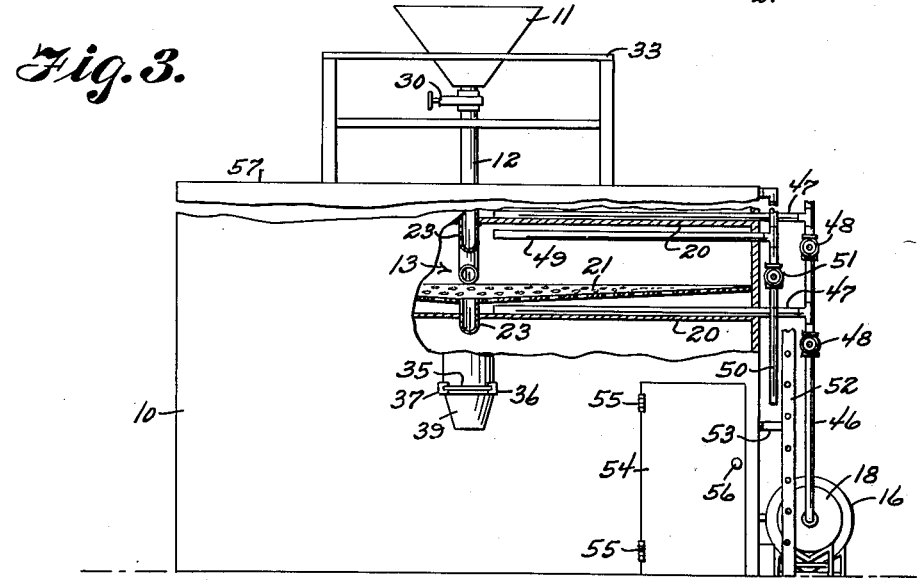
Figure 3 is a front elevational view of the rice dryer also with parts broken away and shown in section.

The housing 10 is provided with a ladder 52 that is held in spaced relation thereto by supports 53, and as shown in Figures 2 and 3 the ladder is positioned adjacent the valves of the air intake and outlet pipes.

The housing is also provided with a door 54 that is mounted on hinges 55 and provided with a latch 56. The upper end of the housing is closed by a cover plate 57 whereby the housing, and also the compartments 13 therein are sealed.

With the parts arranged in this manner rice, grain or the like is supplied to the feed hopper 11 by an elevator, preferably of the bucket type, as indicated by the dotted lines 60 and from the hopper 11 the rice flows through the chutes 12 to the horizontally disposed trays 21 and, with the valves 25 closed, air injected into the area below the trays circulates upwardly through the perforations of the trays agitating the rice deposited thereon and maintaining the rice substantially in suspension for predetermined periods of time. When the rice is dry the valve 25 is opened and the dry rice passes downwardly through the chute 24 to the receiving header 14, from the lower end of which the rice is placed in hoppers or sacks.

It will be understood that any suitable number of trays and compartments may be used and the rice may be supplied to the trays by any suitable means. It will also be understood that air under pressure may be provided by other means and drying means of any suitable type may be used for the air.

It will be understood that other modifications may be made in the design and arrangement of the parts without departing from the spirit of the invention.

What is claimed is:

1. A dryer comprising a vertically disposed housing having spaced horizontally positioned partitions therein providing substantially enclosed compartments, trays having perforated sloping panels positioned in said compartments with the said panels spaced above the partitions and sloping to a common point these panels dividing the compartments providing substantially closed areas between the panels and partitions forming the bottoms of the compartments, means supplying products to the trays independently, means for receiving products from the trays through the said common points thereof, and means supplying air to the substantially closed areas between the panels and partitions whereby air is circulated upwardly through the trays.

2. A dryer comprising a vertically disposed housing having spaced horizontally positioned partitions therein providing substantially enclosed compartments, trays having perforated sloping panels positioned in said compartments with the said panels spaced above the partitions and sloping to a common point these panels dividing the compartments providing substantially closed areas between the panels and partitions forming the bottoms of the compartments, a feed hopper positioned above the housing, individual chutes extended from the feed hopper to the trays in the compartments, chutes for receiving products from the trays extended from the said common points of the trays through the outer wall of the housing, and means supplying air to the substantially closed areas between the panels and partitions whereby air is circulated upwardly through the trays.

3. A dryer comprising a vertically disposed housing having spaced horizontally positioned partitions therein providing substantially enclosed compartments, trays having perforated sloping panels positioned in said compartments with the said panels spaced above the partitions and sloping to a common point these panels dividing the compartments providing substantially closed areas between the panels and partitions forming the bottoms of the compartments, a feed hopper positioned above the housing, individual chutes extended from the feed hopper to the trays in the compartments, chutes for receiving products from the trays extended from the said common points of the trays through the outer wall of the housing, valves in the chutes extended from the feed hopper to the trays, valves in the chutes extended from the said common points of the trays, and means supplying air to the substantially closed areas between the panels and partitions whereby air is circulated upwardly through the trays.

4. A dryer comprising a vertically disposed housing having spaced horizontally positioned partitions therein providing substantially enclosed compartments, trays having perforated sloping panels positioned in said compartments with the said panels spaced above the partitions and sloping to a common point these panels dividing the compartments providing substantially closed areas between the panels and partitions forming the bottoms of the compartments, a feed hopper positioned above the housing, individual chutes extended from the feed hopper to the trays in the compartments, chutes for receiving products from the trays extended from the said common points of the trays through the outer wall of the housing, valves in the chutes extended from the feed hopper to the trays, valves in the chutes extended from the said common points of the trays, an air compressor, means for connecting the discharge of the air compressor to points in the compartments positioned below the trays, escape means in the compartments for the air, and means drying the air as it is supplied to the compartments.

5. In a rice dryer, the combination which comprises a vertically disposed housing having spaced horizontally positioned partitions therein providing substantially enclosed compartments, trays having perforated sloping panels positioned in said compartments, spaced from the partitions forming the bottoms of the compartments, the said panels forming the trays sloping to a common point on the vertical center of the housing, a feed hopper positioned above the housing, chutes independently connecting the feed hopper to the said compartments of the housing, the lower ends of said chutes extended inwardly to points substantially on the vertical center of the housing, means regulating material passing through the chutes, a vertically disposed receiving header positioned at one side of the housing, outlet chutes extended from the low points of the trays in the center of the housing to the said receiving header, valves in the inner ends of the outlet chutes for holding the rice in the trays while the rice is drying, an air supply header having branch connections extended into the compartments of the housing and positioned between perforated trays and horizontal partitions below the trays whereby air is circulated upwardly through the perforations of the trays distributing grain deposited upon the trays, and means supplying air under pressure to the said header.

6. In a rice dryer, the combination which comprises a vertically disposed housing having spaced horizontally positioned partitions therein providing substantially enclosed compartments, trays having perforated sloping panels positioned in said compartments, spaced from the partitions forming the bottoms of the compartments, the said panels forming the trays sloping to a common point on the vertical center of the housing, a feed hopper positioned above the housing, chutes independently connecting the feed hopper to the said compartments of the housing, the lower ends of said chutes extended inwardly to points substantially on the vertical center of the housing, means regulating material passing through the chutes, a vertically disposed receiving header positioned at one side of the housing, outlet chutes extended from the low points of the trays in the center of the housing to the said receiving header, valves in the inner ends of the outlet chutes for holding the rice in the trays while the rice is drying, an air supply header having branch connections extended into the compartments of the housing and positioned between the perforated trays and horizontal partitions below the trays whereby streams of air pass upwardly through the perforations of the panels of the trays drying and distributing grain deposited upon the trays, means supplying air under pressure to the said header, drying means for removing moisture from the air as it is supplied to the compartments, and escape means for air in the said compartments.

WILFORD H. UNDERWOOD.
ERNST TOEPFER.

References Cited in the file of this patent

UNITED STATES PATENTS

| Number | Name | Date |
| --- | --- | --- |
| 359,284 | Plummer | Mar. 15, 1887 |
| 640,319 | Perkins | Jan. 2, 1900 |
| 1,787,280 | Nagel | Dec. 30, 1930 |
| 2,479,387 | Matthews et al. | Aug. 16, 1949 |